U. PEDROARENA AND G. HOFFMAN.
TRACTION WHEEL.
APPLICATION FILED MAY 9, 1922.

1,425,334.

Patented Aug. 8, 1922.
2 SHEETS—SHEET 1.

Inventor
Urbano Pedroarena and
George Hoffman.

By Geo. F. Kimmel.
Attorney

U. PEDROARENA AND G. HOFFMAN.
TRACTION WHEEL.
APPLICATION FILED MAY 9, 1922.
1,425,334.
Patented Aug. 8, 1922.
2 SHEETS—SHEET 2.
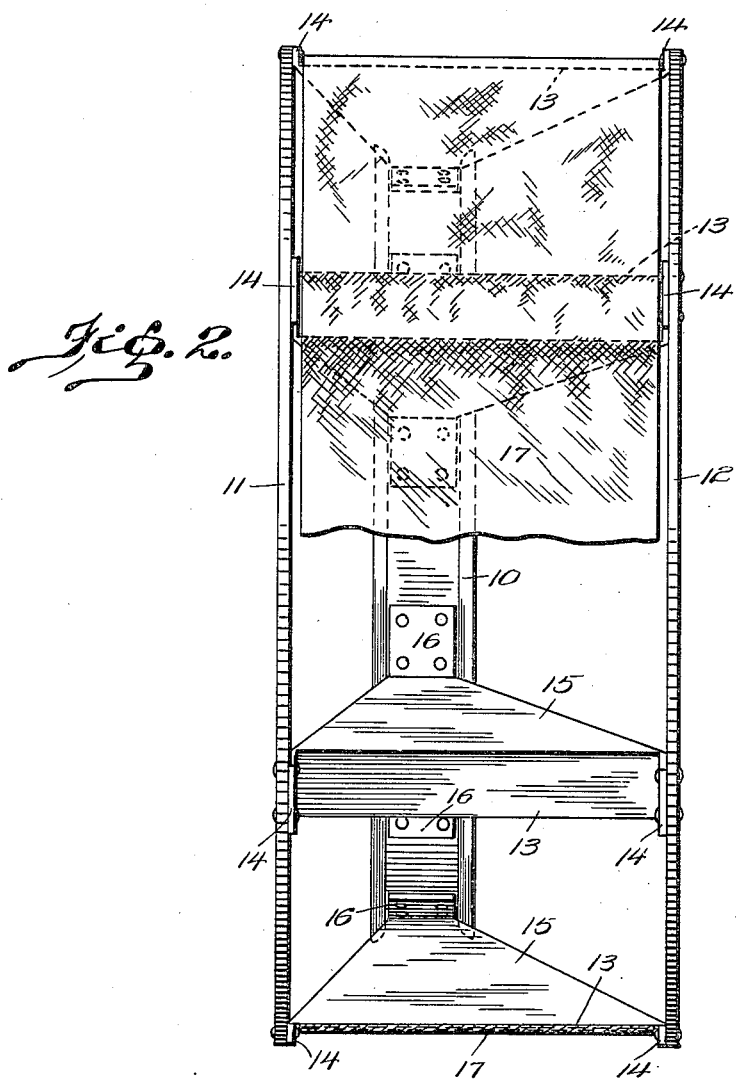
Inventor
Urbano Pedroarena and
George Hoffman.
By Geo. P. Kimmel
Attorney

UNITED STATES PATENT OFFICE.

URBANO PEDROARENA AND GEORGE C. HOFFMAN, OF GARDNERVILLE, NEVADA.

TRACTION WHEEL.

1,425,334.  Specification of Letters Patent.  Patented Aug. 8, 1922.

Application filed May 9, 1922. Serial No. 559,521.

*To all whom it may concern:*

Be it known that we, URBANO PEDROARENA and GEORGE C. HOFFMAN, citizens of the United States, residing at Gardnerville, in the county of Douglas and State of Nevada, have invented certain new and useful Improvements in Traction Wheels, of which the following is a specification.

This invention relates to improvements in wheel tires, more particularly to the tires of motor driven vehicles, and has for one of its objects to provide a tire or tread which may be applied without material structural change to rims of various sizes and construction of wheel rims, and which is adapted for use in travelling over snow or soft roads, and which may also be run upon hard roads, or hard places in soft or snow covered roads, without detaching any of the parts or injury thereto.

With these and other objects in view the invention consists in certain novel features of construction as hereinafter shown and described and then specifically pointed out in the claims, and in the drawings illustrative of the preferred embodiment of the invention:—

Fig. 2 is an edge view with a part of the endless bearing member broken away.

Fig. 4 is a diagrammatic view of a section of a roadbed after the vehicle equipped with a set of the improved tires has passed over it.

The improved wheel tire or tread device includes an inner annular member 10 adapted to be mounted on the rim of the wheel, preferably of a motor driven vehicle wheel, either pneumatic or solid, the wheel rim not being a part of the invention.

The member 10 is shown channelled transversely to fit between the flanges of the wheel rim.

Bearing around the inner annular member 10 are coacting outer annular members 11 and 12, spaced from each other and likewise spaced from the inner member 10. The member 10 corresponds in width to the wheel rim to which it is attached, while the members 11 and 12 are spaced for a greater distance, as shown in Fig. 2, to increase the width of the road engaging surface.

The members 11 and 12 may be of any form or size transversely, but are shown oblong for illustration.

Figure 1:
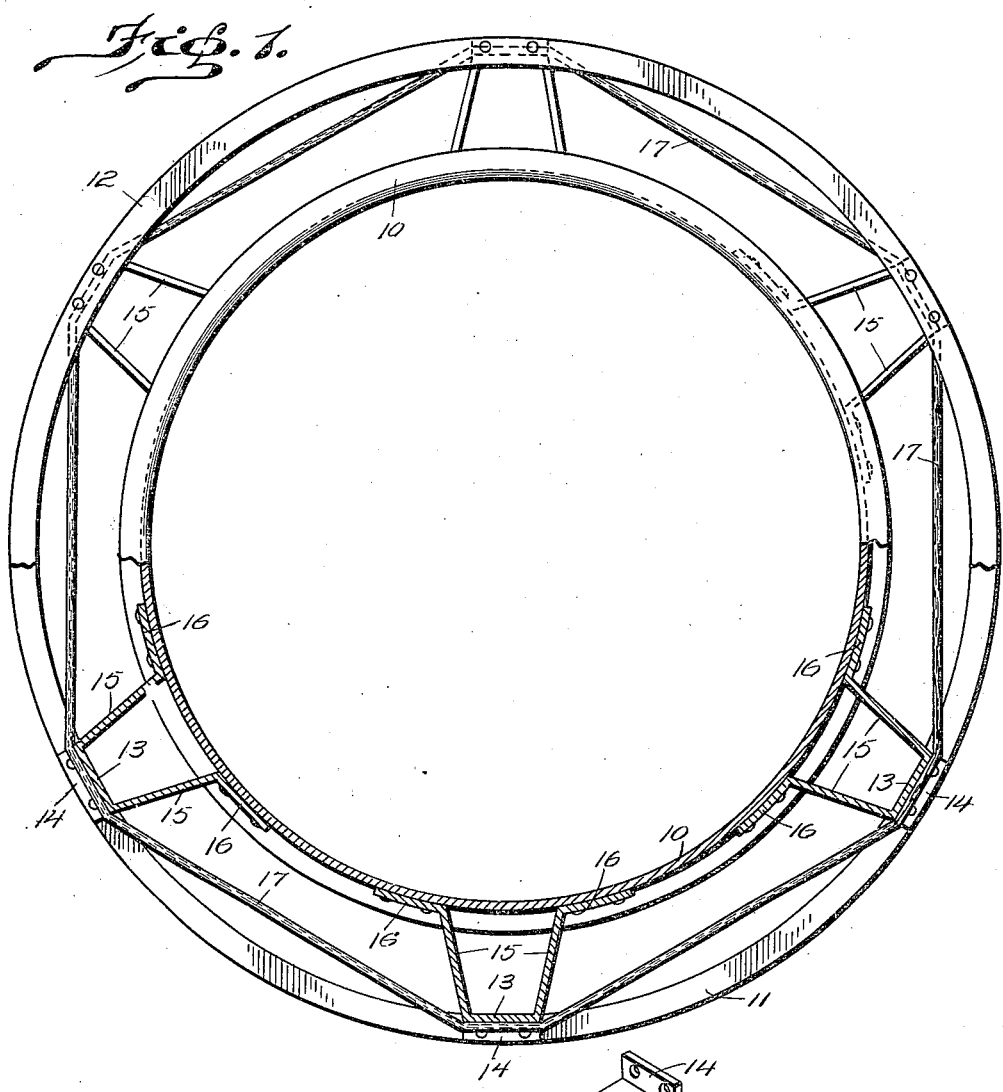
Figure 1 is a side elevation of the improved wheel tire, partly in section.
Figure 3:
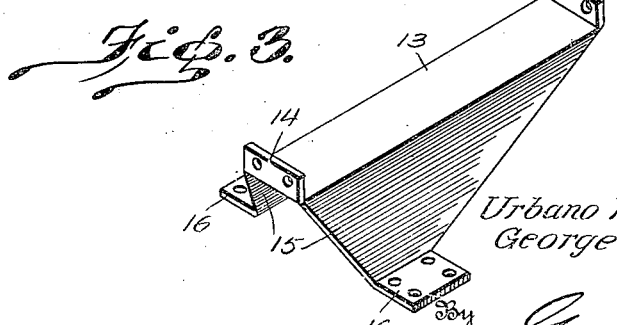
Fig. 3 is an enlarged perspective view of one of the supporting brackets.

The members 11 and 12 are coupled together and to the member 10 by a plurality of bracket devices, one of which is represented in Fig. 3, and each including a bearing portion 13 having outturned attaching flanges 14 at the ends to be riveted or otherwise connected to the members 11 and 12, and with bracing webs 15 diverging toward the member 10 and terminating in attaching flange 16 to be riveted or otherwise connected to the member 10.

By this means the inner annular member 10 and the outer annular members 11 and 12 are rigidly coupled and held in their spaced relation.

The bearing portions 13 are flat and continuous from end to end, and sunken inwardly of the outer lines of the members 11 and 12 a distance equal to the depth of the flanges 14.

Bearing over the faces 13 of the brackets is an endless member 17 of heavy canvas, or compounds of canvas and rubber, or the like, or of flexible sheet metal, as may be preferred, the endless member being materially wider than the member 10 and the rim of the wheel to correspondingly increase the "tread" of the wheel.

The improved device will be found of great advantage in moving over the snow or soft or sandy roads.

The members 11 and 12 extending beyond the member 17 dig into the snow or soft ground and thus effectually prevent "skidding" and cause the vehicle to travel in a straight line.

The improved device is simple in construction, can be constructed of any required size and of any suitable material and adapted without material structural change to wheels of different forms and sizes. The improved device may be constructed of sufficient weight and strength to be employed under trucks of the heaviest kind, and will generally be applied to the rear wheels, but may be employed on the forward wheels if desired or required.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. A wheel tire device comprising an annular member adapted to be engaged upon the rim of a wheel, coacting outer annular members in spaced relation and spaced from the inner annular member, a plurality of bracket devices attached to the inner and outer annular members, and an endless member bearing over said brackets.

2. A wheel tire device comprising an annular member adapted to be engaged upon the rim of a wheel, coacting outer annular members in spaced relation and spaced from the inner annular member, a plurality of bracket devices each including a bearing portion having outstanding attaching flanges adapted to be connected to the outer annular members to dispose the bearing portions within the lines of the outer annular members, and an endless member engaging over the bearing portions of the brackets and held from lateral displacement by the attaching flanges.

3. A wheel tire device comprising an annular member adapted to be engaged upon the rim of a wheel, coacting outer annular members in spaced relation and spaced from the inner annular member, a plurality of bracket devices attached to the inner and outer annular members, and an endless flexible member bearing over said brackets.

In testimony whereof, we affix our signatures hereto.

URBANO PEDROARENA.
GEO. C. HOFFMAN.